US007957720B2

(12) United States Patent
Mumford et al.

(10) Patent No.: US 7,957,720 B2
(45) Date of Patent: *Jun. 7, 2011

(54) SYSTEMS AND METHODS FOR PROVIDING MULTIPLE SIMULTANEOUS CALLS FROM THE SAME PREPAID ACCOUNT

(75) Inventors: Gregory L. Mumford, Marion, IA (US); Jon E. Abel, Cedar Rapids, IA (US); David A. Fitzgerald, Springville, IA (US); Radhika Gunasekar, Cedar Rapids, IA (US); Anna Marie Appleby, Cedar Rapids, IA (US); John M. Leslein, Marion, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 861 days.

This patent is subject to a terminal disclaimer.

(21) Appl. No.: 11/862,659

(22) Filed: Sep. 27, 2007

(65) Prior Publication Data
US 2009/0088127 A1   Apr. 2, 2009

(51) Int. Cl.
*H04M 11/00* (2006.01)

(52) U.S. Cl. ... 455/406; 455/407; 455/408; 379/114.01; 379/114.03

(58) Field of Classification Search .................. 455/405, 455/406, 407, 408, 414.1, 418–420; 379/114.03, 379/114.1, 115.01, 121.02, 126–127.05
See application file for complete search history.

(56) References Cited

U.S. PATENT DOCUMENTS

| 6,487,401 | B2 * | 11/2002 | Suryanarayana et al. ..... 455/406 |
| 6,925,160 | B1 * | 8/2005 | Stevens et al. ........... 379/121.05 |
| 7,003,280 | B2 * | 2/2006 | Pelaez et al. .................. 455/406 |
| 7,184,530 | B2 * | 2/2007 | Warrier et al. ........... 379/114.15 |
| 7,280,645 | B1 * | 10/2007 | Allen et al. ................. 379/114.2 |
| 7,650,137 | B2 * | 1/2010 | Jobs et al. ..................... 455/405 |
| 2002/0103762 | A1 * | 8/2002 | Lopez et al. .................... 705/63 |
| 2005/0053211 | A1 * | 3/2005 | Bevente et al. .......... 379/121.02 |
| 2007/0106569 | A1 * | 5/2007 | McQuaide et al. ............. 705/26 |
| 2008/0096524 | A1 * | 4/2008 | True et al. ..................... 455/406 |

FOREIGN PATENT DOCUMENTS

WO   98/56160   12/1998

* cited by examiner

*Primary Examiner* — Stephen M D'Agosta

(57) ABSTRACT

Prepaid services include associating a plurality of users with a prepaid services account. The account is configured to track a prepaid balance associated with the account as well as to allow at least a subset of the plurality of users associated with the account to draw down the prepaid balance at least generally at the same time. Drawing down the prepaid balance includes allocating a portion of the prepaid balance to each respective user, monitoring a provision of service, and repeating, selectively, the allocating and monitoring.

14 Claims, 4 Drawing Sheets

SYSTEMS AND METHODS FOR PROVIDING MULTIPLE SIMULTANEOUS CALLS FROM THE SAME PREPAID ACCOUNT

BACKGROUND

Service providers may have the option to extend credit to customers for provided services with the expectation of payment at the termination of a service period. Alternatively, a service provider may require a customer to pay for services before they are provided. So-called prepaid services may allow a customer to purchase services prior to their provision and usage. Accordingly, a prepaid customer may maintain a positive monetary balance in a prepaid account held with the service provider. Alternatively, the customer may purchase units of service from the service provider for use over a period of time. In the example of a prepaid telecommunications service, a prepaid customer may purchase telecommunications services in units such as minutes.

Prepaid accounts may maintain a locked status while being used by a customer. Maintaining a locked status during the provision of service may simplify the call processing such that an account balance need not be divided among multiple simultaneous callers. However, in certain contexts, e.g., business customers and family calling plans, among others, it may be desirable to maintain a single prepaid account allowing multiple simultaneous callers to draw down the account balance.

DETAILED DESCRIPTION OF PREFERRED EMBODIMENTS

Figure 1:
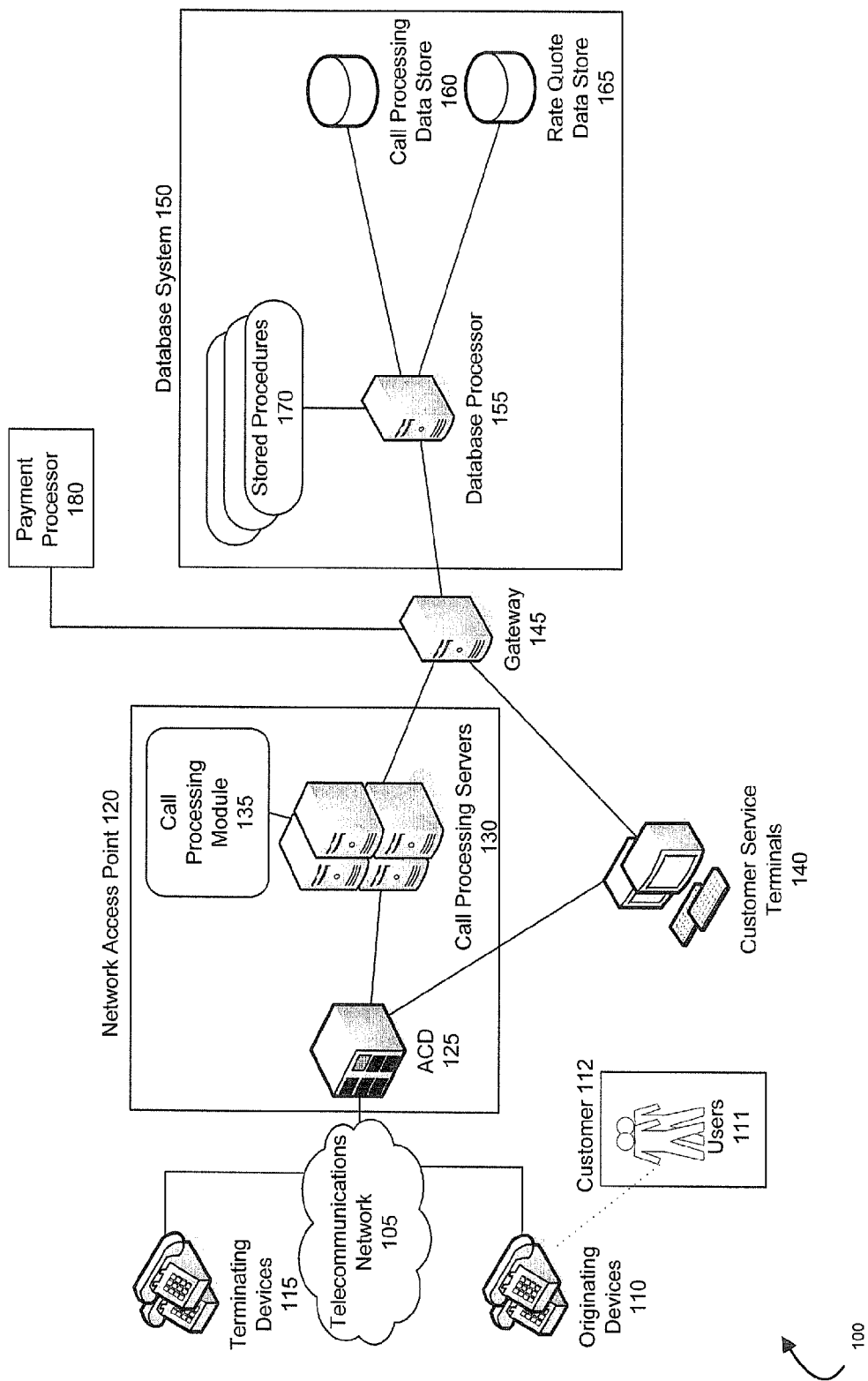
FIG. 1 illustrates an exemplary prepaid service system for providing prepaid telecommunication services.

FIG. 1 illustrates one possible exemplary prepaid service system 100 for providing prepaid telecommunication services. Originating devices 110 connect to a network access point 120 and to terminating devices 115 through a telecommunications network 105. The network access point 120 may maintain a connection to telecommunications network 105 and may include system 100 elements such as an automated call distributor (ACD) 125 as well as a plurality of call processing servers 130. In addition to connecting to the call processing servers 130, the automated call distributor may connect to one or more customer service terminals 140. A call processing module 135 may be located on the call processing servers 130 and may include computer instructions configured to provide prepaid telecommunication services to a customer 112. A gateway server 145 may serve as an intermediary between the call processing servers 130, the customer service terminals 140, and a prepaid database system 150. The prepaid database system 150 may include a database processor 155 configured to execute a plurality of stored procedures 170. The processor 155 additionally has access to a call processing data store 160 and a rate quote data store 165.

Telecommunications network 105 may be a circuit switched network generally referred to as a public switch telephone network (PSTN). Alternatively, telecommunications network 105 may be a combination of circuit switching and packet switching network elements cooperatively connected to enable signaling system seven (SS7) based telephone calls. Other networks such as cellular networks for wireless calls and Voice Over Internet Protocol (VOIP) networks for packet switched network based voice calls may also be integrated with telecommunications network 105. Accordingly, it is be understood that network 105 includes switches, links, gateways, etc. as necessary to facilitate the transmission of calls and data between devices 110 and 115.

While depicted as a conventional telephone, originating devices 110 may be any type of telecommunications devices capable of connecting to telecommunication network 105 and communicating via one or more protocols associated therewith. Accordingly, originating devices 110 may be capable of accepting input from users 111 such as an access number for the telecommunications network access point, a prepaid account identifier 210 (FIG. 2), and a telephone number associated with the terminating device 115. Similarly to originating devices 110, terminating devices 115 may be any type of telecommunications device capable of connecting to telecommunications network 105 and receiving an incoming call therefrom. It is to be understood that there may be many originating and terminating devices 110, 115 connecting to the prepaid services system 100 at any given time. When using originating device 110 to access system 100, users 111 may be considered originating callers.

It is to be understood that FIG. 1 and this description thereof illustrates prepaid service in the example of prepaid telecommunications services. However, the method 300 described below, may in whole or part be applicable to other forms of prepaid services. Even in the example of prepaid telecommunications services, there may be multiple entities responsible for providing the elements of system 100. For instance, a telecommunications network provider may provide some of the components while a prepaid service provide may provide others. Additionally, terminating devices 115 may not exist at all. For instance, originating devices 110 may receive a prepaid service that does not include terminating devices 115.

Network access point 120 provides a connection to telecommunications network 105 for the prepaid service provider. Network access point 120 may host telecommunications equipment for implementing a so-called intelligent network or intelligent services network. The intelligent network generally enables a telecommunications provider to offer value-added services, such as prepaid calling, to traditional telecommunication systems. Among other equipment, intelligent networks may include automated call distributor 125 and call processing servers 130. Network access point 120 may further provide local or wide area network connections for connecting prepaid services system 100 devices, e.g., automated call distributor 125, call processing servers 130, etc. While FIG. 1 only depicts a single telecommunications network access point, it is to be understood that prepaid services system 100 may have multiple such network access points 120, which may be geographically dispersed.

Automated call distributor 125 maintains a connection to telecommunications network 105 in order to receive incoming connections from originating devices 110 and establish connections with terminating devices 115. Automated call distributor 125 may include a telecommunications switching device such as a private branch exchange (PBX). Additionally, automated call distributor may include a processing device configured to execute call routing rules that direct an incoming call to other devices, e.g., call processing servers 130, customer service terminals 140, etc. Automated call distributor 125 may further queue incoming calls should there ever be insufficient resources available to immediately handle the calls. While FIG. 1 merely illustrates a single automated call distributor 125, other exemplary approaches may include multiple automatic call distributors 125.

Call processing servers 130 receive calls routed from automated call distributor 125 and may provide interactive functionality to users 111. Call processing servers 130 may be automated response units, or voice response units. Such units may provide users 111 with an audible menu of options. Users 111 may select an option by entering a number on the key pad of their device 110 corresponding to a particular menu option. Call processing servers 130 may be further configured to receive options through voice recognition software such that users 111 may speak the menu option corresponding with their selection. Call processing servers 130 may receive multiple inputs from users 111 in addition to any menu selections. These inputs may include a prepaid services account identifier 210, a security pin, and a phone number of a terminating device 115.

Figures 2A, 2B:
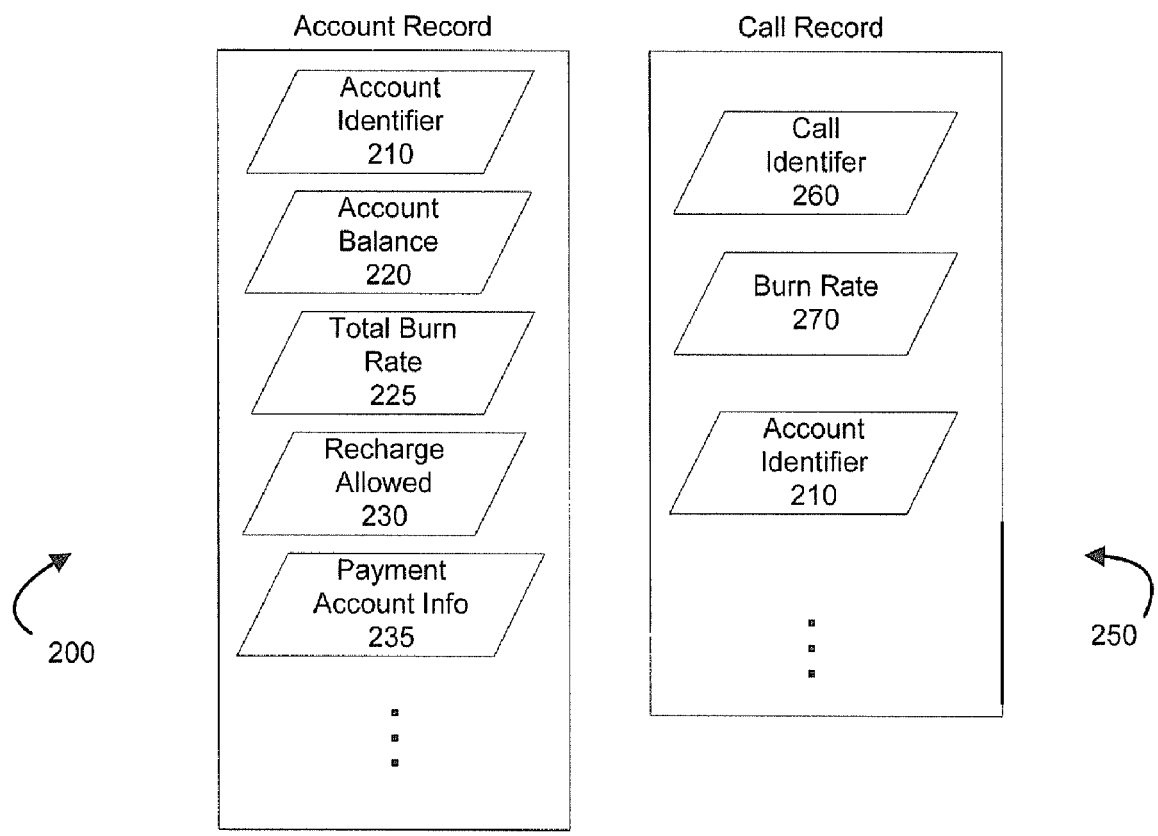
FIG. 2a illustrates an exemplary database table definition relating to a prepaid services account record.
FIG. 2b illustrates an exemplary database table definition relating to a call record.

Call processing servers 130 may control automated call distributor 125 through signaling communication in order to establish a connection through telecommunications network 105 to terminating device 115. Similarly, call processing servers 130 may provide signaling instructions to automated call distributor 125 in order to end, or tear down, the connections between originating devices 110 and terminating devices 115. Call processing servers 130 may periodically monitor the connections between originating devices 110 and terminating devices 115 in order to track the duration of time in which the connection is maintained, and may further conference into the connection in order to provide automated messages to users 111, e.g., messages indicating an impending depletion of a account balance 220 (FIG. 2a).

Additionally, call processing servers 130 may include a computer readable medium encoded with computer executable instructions configured to effectuate account tracking and call processing features of the prepaid services system 100. Such computer instructions may be included in a call processing module 135. Call processing module 135 may conceptually divide a call spanning a service period into one or more lengths of time such that each length of time may represent a service increment. Service increments may be a standard increment or a custom increment. The length of time associated with a standard increment is generally equal to all other standard increments associated with a call. However, the length of time associated with a custom increment may vary from that of other custom increments as well as from that of standard increments. The length of time associated with a standard increment may be established on a system-wide, account-by-account, or product-by-product basis. Accordingly, dividing the service period into one or more service increments may allow system 100 to determine whether the account balance 220 (FIG. 2a) is sufficient prior to providing service for an additional service increment. Additionally, call processing module 135 may be configured to provide service to a user 111 for a custom increment rather than a standard increment if account balance 220 is insufficient to provide service for the length of time associated with a standard increment. As will be discussed below, account balance 220 does not necessarily store a monetary value. Rather, account balance 220 may store a unit of service balance. Additionally, drawing down the balance 220 incrementally at each service increment may allow one or more simultaneous users 111 to draw down the same account balance 220. Accordingly, call processing servers 130 may further monitor the account balance 220 and any draw downs thereof in order to determine whether there is a sufficient balance to continue to provide service to the simultaneous users 111. A more detailed description of the exemplary operations that may be provided by call processing module 135 is provided below.

A gateway 145 may act as an intermediary between telecommunications network access point 120, customer service terminals 140, and prepaid database system 150. Gateway 145 may include network connections to database system 150, call processing servers 130, and customer service terminals 140. In one exemplary approach, the network connections to gateway 145 may be established on a private local area network or wide area network that can more closely guarantee the quality of service in order to minimize latency and thereby provide real-time or near real-time access and updates to data held in data stores 160 and 165. Gateway 145 may receive all requests for access to prepaid database system 150 in order to provide a barrier to direct access to database system 150. Limiting access to database system 150 may be appropriate in some circumstances. For instance, exemplary approaches may provide, queuing, improved security, access to legacy systems, etc. It is to be understood that some database processors 155 may be capable of handling a large number of requests from the call processing servers 130 and customer service terminals 140 and therefore may eliminate the need for gateway 145.

Gateway 145 may be a web application server, although any computing device having a computer readable medium including instructions for communicating with database system 150 would suffice. Gateway 145 may be a networked computer system configured with server software for accepting connections from the call processing servers 130 and customer service terminals 140. Call processing servers 130, for instance, use these connections to execute remote procedure calls on gateway 145. The remote procedure calls executed on gateway 145 communicate with database processor 150 to retrieve and set data on database system 150 through the stored procedures 170 (discussed below). While FIG. 1 merely depicts a single gateway 145, it is to be understood that gateway 145 may include a pool of gateways 145 configured to share the responsibility of interacting with database system 150.

Payment processor 180 may receive payment requests from gateway 145 and further may provide acknowledgement that a payment request was accepted. Such a payment processor 180 may be external to system 100 and may be entirely external to the telecommunications provider that offers system 100. Payment processor 180 accepts payment account information 235 (FIG. 2a) as well as a payment amount and determines whether the provided account can accept the payment amount. The payment account may be a credit card account, and payment processor 180 may be a credit card processor. Payment processor 180 in cooperation with gateway 145 and call processing servers 130 may allow a prepaid account balance 220 (FIG. 2a) to be recharged while at least one originating device is receiving service, i.e. during an ongoing call.

Database system 150 may be a relational database management system. Many such systems, including SQL Server, Oracle, and MySQL, among others, are generally available. Call processing data store 160 generally stores call processing data in row and column table format, and may include multiple tables. A row, or record, includes one or more columns, or fields, holding data values for specifically defined fields. Rows may be uniquely identified by the values of one or more columns. Indexes of one or more columns can be included to aide in searching for particular rows of the table. Other database systems, e.g., embedded databases, hierarchical systems, file based storage, etc., could be used as database system 150. Database processor 155 includes instructions on a computer readable medium that facilitate database transactions. Such instructions may be provided by one or more stored procedures 170. Additionally, processor 155 may include instructions for the bulk or mass loading of data, e.g. card activations from retail purchases. Similarly, bulk exporting of data may be needed to support accounting and revenue reporting features.

FIG. 1 depicts rate quote data store 165 as being part of database system 150. However, rate quote data store 165 may have uses outside of the context of system 100. Accordingly, it is to be understood that rate quote data store 165 may be external to system 100, such that gateway 145 may access data thereon. In an exemplary approach that excludes gateway 145, rate quote data store 165 may be accessible by call processing servers 130.

Incoming calls to automated call distributor 125 may be routed to customer service terminals 140 in order to provide personalized customer service to users 111. Customer service terminals 140 may include a computing device and a display. A graphical user interface (GUI), or the like, provided by the terminals 140 may enable customer service personnel to access the prepaid database system 150 through the gateway 145. Accordingly, the customer service terminals 140 may provide access to stored procedures 170 of database system 150. As discussed above, stored procedures 170 manipulate the data associated with an account record 200.

FIG. 2a illustrates an exemplary account record 200 for use with system 100. Account record 200 may be stored in call processing data store 160 of database system 150. An account identifier field 210 provides a unique identifier to differentiate accounts from one another. An account balance field 220 specifies the balance available to users 111 to draw upon when receiving prepaid services. The value stored in account balance field 220 may be a monetary value. However, in other exemplary approaches the value may be the number of units of service that were purchased, e.g., minutes. A total burn rate 225 may store the rate at which account balance 220 is being depleted. In one exemplary approach, total burn rate 225 will be updated as the number of simultaneous users 111 changes. Customer 112 may optionally allow account balance 220 to be recharged automatically. The preference of a Customer 112 regarding whether account balance 220 may be recharged automatically may be stored in the recharge allowed field 230. Payment account information that may be necessary to effectuate an automatic recharge may be stored in payment account info field 235.

FIG. 2b illustrates an exemplary call record 250 for use with system 100. A call identifier field 260 provides a unique identifier to differentiate call records 250 from one another. Call burn rate 270 may store the rate at which a particular call is depleting account balance 220. Call record 250 may further include an account identifier 210 in order to provide a link between an account and the set of calls related to the account. A particular call record 250 may only exist in call processing data store 160 while a call is ongoing. However, call record 250 may be archived in another data store. Call record 250 may include any number of additional fields, e.g., start and end times of a call, phone numbers of originating and terminating devices, etc.

Stored procedures 170 (FIG. 1) may include computer executable instructions stored in database system 150 and may provide access to data stored in data stores 160 and 165. Stored procedures 170 may exist to conduct a balance inquire by accepting an account identifier 210 as a parameter and providing the account balance 220 associated therewith. A deduction procedure may deduct a provided amount from the account balance 220. Stored procedures 170 for creating and removing call records 250 may further be provided. Stored procedures 170 may further include a procedure for determining the call burn rates 270 and setting an account burn rate 225.

Prepaid telecommunication accounts represented by exemplary account record 200 may include a physical representation in the form of a plastic card, i.e., a calling card. A calling card representing an account with a prepaid balance 220 stored in database system 150 may be referred to as a remote memory card. Accordingly, the balance 220 is not stored or encoded on the card. The card merely includes the account identifier 210 which enables system 100 to determine the account balance 220 from call processing data store 160. However a physical card is not required and often is not provided due to the ability to purchase prepaid telecommunication services over the Internet from World Wide Web based retailers.

Prior to an account being available for use by customer 112, the accounts must be created. Creation of an account may include the assignment of a unique account identifier 210 and an initial balance 220. In one exemplary approach, the account identifiers 210 are created and loaded into call processing data store 160 in batches. After creation, the account identifiers 210 may be provided to retail businesses for sale. After purchase by customer 112, the retailer may notify system 100 that the account should be activated for access and use by customer 112. However, it is to be understood that retailers are not the only source of prepaid accounts. The prepaid service provider may provide accounts directly to customer 112.

Computing devices such as call processing servers 130, gateway 145, and database processor 155 may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as call processing servers 130, gateway 145, and database processor 155, etc., may each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Database system 150 may be a relational database management system (RDBMS). An RDBMS may employ Structured Query Language (SQL) in addition to a language for creating, storing, editing, and executing stored procedures, such as the PL/SQL language mentioned above. However, it is to be understood that database system 150 may be some other kind of database such as a hierarchical database, a set of files, an application database in a proprietary format, etc. Database system 150 may include a computing device, i.e., processor 155, employing a computer operating system such as one of those mentioned above, and is accessed via a network in any one or more of a variety of manners, as is well known. Exemplary systems are possible in which at least some of data stores 160 and 165 are both combined as a single data store, or are provided on completely independent databases.

Figure 3A:
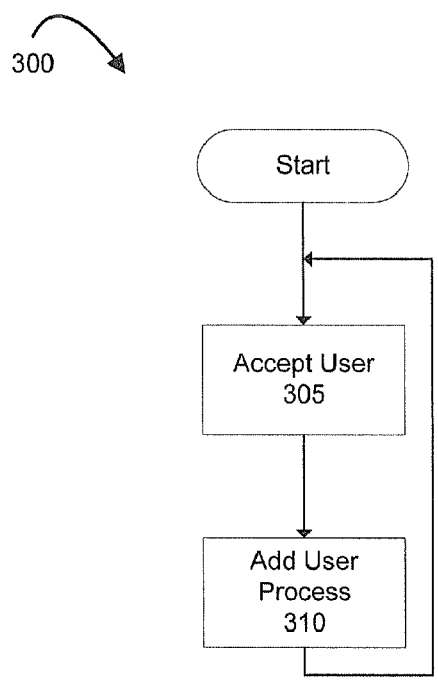
FIG. 3a illustrates a flowchart depicting exemplary steps for continuously accepting users.

FIG. 3a illustrates a flowchart of an exemplary process 300 for accepting users 111 of prepaid service system 100. Call processing servers 130 may include a computer-readable medium having stored instructions for carrying out certain operations described herein, including some or all of the operations described with respect to process 300. For example, some or all of such instructions may be included in call processing module 135.

The process begins in step 305 when system 100 accepts a user 111 Automatic call distributor 125 may receive an incoming call from originating device 110 operated by user 111. In step 310, the incoming call may be passed to call processing server 130 for handling by call processing module 135. Call processing module 135 may add a concurrent user process 400 (described below) for handling user 111. Following step 310, the process returns and may accept another user 111 in step 305. It is to be understood that process 300 may continuously accept users 111 and add user processes 400. Moreover, the acceptance of a user 111 does not require that a prior user process 400 be concluded.

Figure 3B:
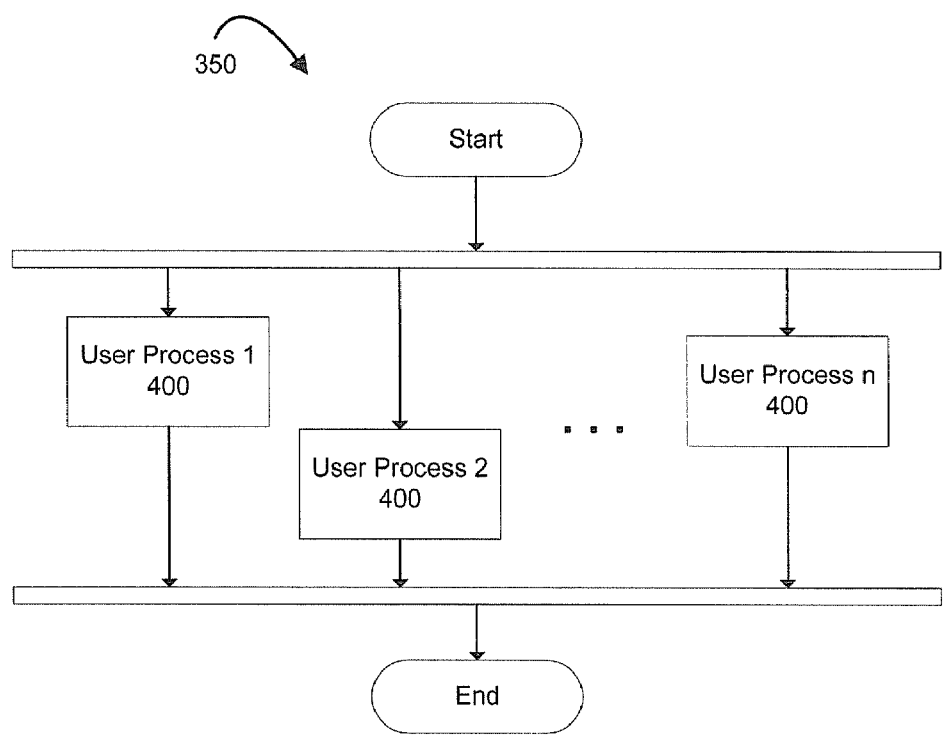
FIG. 3b illustrates a flowchart depicting exemplary steps for concurrently handling users.
Figure 4:
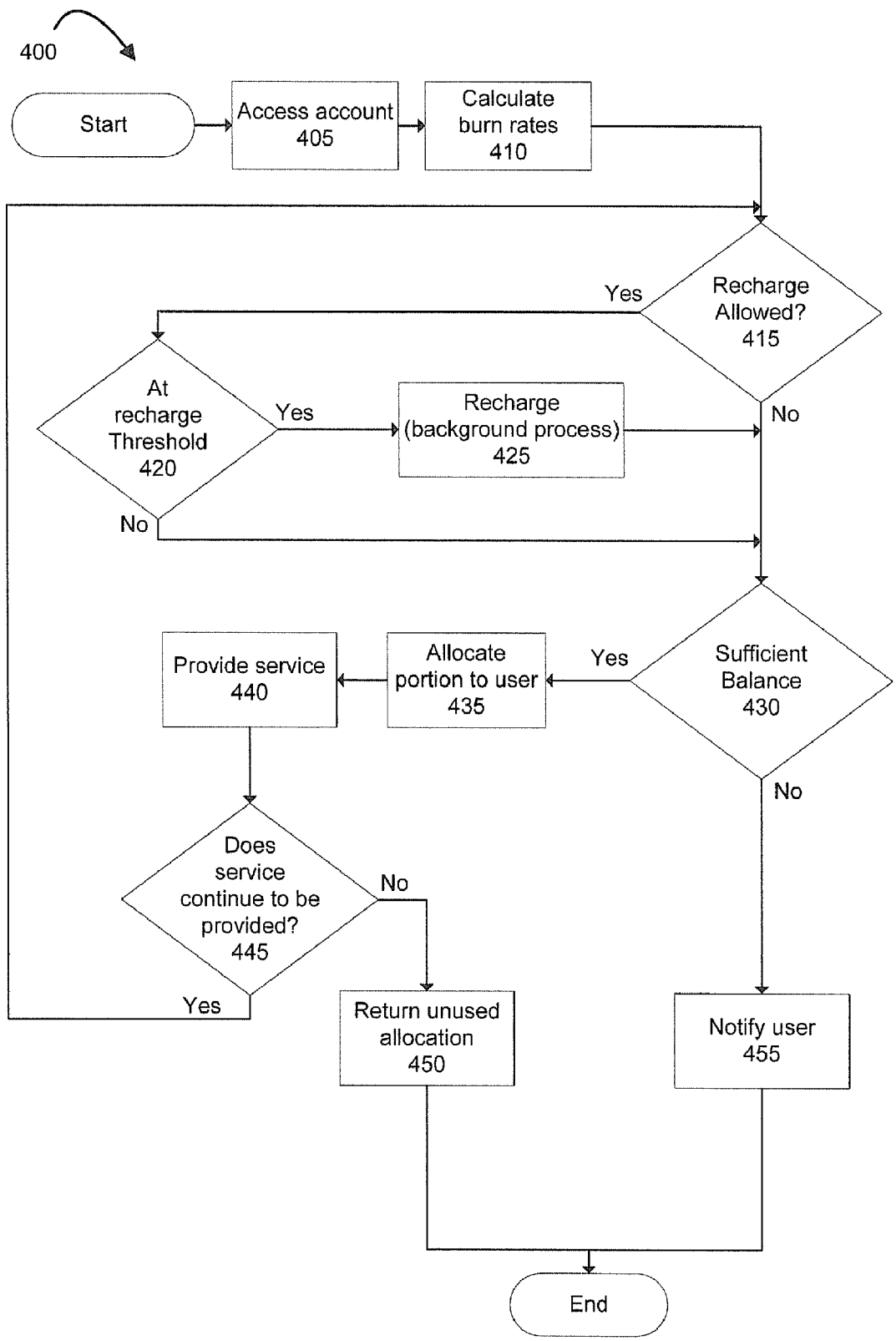
FIG. 4 illustrates a flowchart depicting exemplary steps and decisions relating to a method for providing prepaid services to a single user.

FIG. 3b illustrates a flowchart of an exemplary process 350 for handling concurrent users 111. One or more user processes 400 (described below) may be handled concurrently on system 100. As described above, a new user process 400 is added in step 310. User processes 400 may start and end based on their own timing, e.g. based on the start and end times of a call from originating device 110 by user 111. FIG. 3b further illustrates that there may be many (1-n) concurrent user processes 400. User processes may include calls from users 111 associated customer 112, as well as users 111 associated with other customers 112. Moreover, at least a subset of users 111 associated with customer 112 may have user processes 400 being handled concurrently such that account balance 220 may be shared at least generally at the same time, FIG. 4 illustrates a flowchart of an exemplary process 400 for providing prepaid services to a simultaneous user 111 of a prepaid services system 100. At any given time there may be many such users 111. However, exemplary process 400 merely illustrates the process of handling a single user 111 who may be one of multiple simultaneous users 111. Accordingly, many instances of exemplary process 400 may be proceeding concurrently. Moreover, user 111 may be one of at least a subset of users 111 associated with customer 112 that may share account balance 220 at least generally at the same time. While this process 400 is directed to the provision of prepaid telecommunications services, it is to be understood that these steps are equally applicable to other forms of prepaid services. Call processing servers 130 may include a computer-readable medium having stored instructions for carrying out certain operations described herein, including some or all of the operations described with respect to process 400. For example, some or all of such instructions may be included in call processing module 135.

The process 400 begins in step 405 in which a user 111 accesses a prepaid account. User 111 may connect and disconnect at will. Aside from potentially drawing from the same account balance 220, user 111 generally has no effect on other users 111 that may be simultaneously connected. Upon connecting, user 111 may provide account identifier 210. A new call record 250 may be established for each connection made by user 111.

Next, in step 410, call processing module 135 may calculate the call burn rate 270 and the total burn rate 225. The total burn rate 225 represents the rate that the simultaneous users collectively draw down the account balance 220. The total burn rate 225 may be expressed as an amount for a given period of time, e.g., $3/ minute. In a prepaid calling system 100, certain calls may receive different burn rates 270, e.g., different rates for domestic and international calls. Similarly, certain calls, such as those from payphones, may have higher fees associated therewith. Accordingly, when a new simultaneous user 111 connects and seeks to begin drawing down the account balance 220, call processing module 135 must first retrieve the rate and fee info for the new call and store it in a call record 250 as a call burn rate 270. The call burn rate 270 may be added to the total burn rate 225 of the account. Accordingly, the total burn rate 225 may be calculated by summing the call burn rates 270 from simultaneous calls drawing from the same account balance 220. Similarly, when the caller disconnects and draw downs cease, the call burn rate 270 may be subtracted from the total burn rate 225.

It is to be understood that more simultaneous users 111 may result in a larger total burn rate 225. Moreover, the account balance 220 may deplete more quickly as more simultaneous users 111 are connected. The time it takes to deplete the account balance 220 will depend on the total burn rate 225, which generally depends on the number of simultaneous users 111. Accordingly, the greater the total burn rate 225, the quicker the account balance 220 will need to be recharged. Moreover, the total burn rate 225 may be recalculated when at least a subset of users 111 drawing from the same account balance 220 changes.

Next, in step 415, call processing module 135 may determine whether the account balance 220 may be automatically recharged. Account record 200 may include recharge allowed field 230. The Boolean value of recharge allowed field 230 may be compared to determine whether call processing server 130 may conduct an automatic recharge of the account balance 220. If a recharge is not allowed, then the process proceeds to step 430. Alternatively, if the recharge allowed field 230 indicates that a recharge is allowed, then the process proceeds to step 420.

Next, in step 420, call processing module 135 may determine whether the account balance 220 requires a recharge. The determination of whether the account balance 220 requires a recharge may be based on the account balance 220 alone, or on the account balance in association with the total burn rate 225 of the account and the time it takes to effectuate a recharge. In one exemplary approach, a fixed minimum balance threshold may be established such that an account balance 220 dropping below the fixed minimum balance threshold may indicate that a recharge is required. In another exemplary approach, the minimum balance threshold may be variable rather than fixed. In such an approach, the variable threshold would be based on the account balance 220 in association to the total burn rate 225 of the account and the time it takes to effectuate a recharge. For instance, system 100 may maintain a system wide recharge time. The recharge time relates to the recharge step described below in step 425. Specifically, the recharge time may be a predetermined length of time that is required to effectuate a recharge. Moreover, the length of time to effectuate a recharge may vary, but a maximum expected length of time to effectuate a recharge may be known. This maximum expected length of time may be the recharge time.

In order to maintain service without providing credit to the user 111, the account balance 220 should be sufficiently large such that it is not depleted during the recharge step. Accordingly, the account balance 220 may be divided by the total burn rate 225 calculated in step 410 in order to compare the result to the recharge time. When the result of this calculation is less than or equal to the recharge time, it may be determined that a recharge is required. Accordingly, in one exemplary approach there is no fixed minimum balance threshold that would cause a recharge to occur. The account balance 220 in association with the maximum expected length of time to effectuate a recharge may determine a threshold for determining when to conduct a recharge. The threshold may be varied as needed by altering the length of the maximum expected length of time to effectuate the recharge. Moreover, the level of the account balance 220 at the time a recharge is required may vary based on the total burn rate 225. Initiating a recharge when balance 220 reaches a threshold level rather than waiting until the balance 220 becomes depleted may allow the recharge step 425 to proceed as a background or concurrent process to the other steps of process 400 or any other concurrently proceeding processes 400. If it is determined that a recharge is required the process proceeds to step 425, discussed below. If a recharge is not required, then the process proceeds to step 430.

In step 425, call processing module 135 may automatically recharge the account balance 220. Call processing server 130 may initiate a recharge by querying call processing data store 160 for payment account information 235. Call processing server 130 may then send a recharge request including the retrieved payment account information 235 along with a recharge amount to gateway 145. Gateway 145 sends the payment account information 235 and recharge amount to payment processor 180. It is to be understood that because there may be concurrent user processes 400, the recharge of the account balance 220 may occur contemporaneously with the allocating of a portion of the account balance 220 to another user 111. Gateway 145 may receive a response indicating whether payment processor 180 accepted the payment account information 235 and recharge request. Upon receiving an acknowledgement that the recharge was accepted, gateway 145 may call a stored procedure 170 in order to update the account balance 220 with the amount of the recharge.

In step 430, it may be determined whether there is a sufficient account balance 220. As discussed above, system 100 divides a service provided to customer 112 over a service period into one or more service increments that may correspond to lengths of time. Service increments may include standard increments or custom increments. System 100 may set the length of time corresponding to a standard increment on a system-wide, account-by-account, or service-by-service basis. In one exemplary approach, account balance 220 may need to be greater than an allocation associated with the provision of service for a standard increment. Accordingly, the allocation may be calculated by multiplying the length of time associated with the standard increment with the call burn rate 270. In another exemplary approach, call processing module 135 may be able to provide service for a custom increment that is less than the standard increment. In such an approach, account balance 220 that is too low for the provision of service for the standard increment may still be effectively depleted by providing service for a custom increment. The length of time associated with a custom increment may be determined based on the call burn rate 270 and the account balance 220. Similarly, in such an exemplary approach, the allocation may be the remaining account balance 220. If there is a sufficient account balance 220, the process proceeds to step 435.

In step 435, call processing module 135 may allocate a portion of the account balance 220 to user 111. As discussed above, the account balance 220 may be drawn down incrementally and continuously throughout a call. The drawn down portions (allocations) of the account balance 220 may be allocated to user 111 throughout the service period. If more than one user process 400 is concurrently proceeding, the draw downs of the same account balance 220 may occur at least generally at the same time in an asynchronous manner. Asynchronous draw downs may remove any possible issues related to timing and coordination between concurrent user processes 400. For instance, users 111 that share the same account balance 220 may connect and disconnect from system 100 independently from one another. Moreover, an allocation to a user 111 may be timed independently from allocations to other users 111 sharing the same account balance 220.

Next, in step 440, service may be provided to user 111 for up to a length of time corresponding to the length of the service increment. For a previously established connection between originating device 10 and terminating device 115, the connection may simply be maintained. For a newly connected user 111, call processing server 130 may cause automated call distributor 125 to establish a telecommunications connection between originating device 110 and terminating device 115. Call processing server 130 may farther create a call record 250 including at least the account identifier 210 and the call burn rate 270. Other call details such as the number of the originating device, the number of the terminating device, and the time that service was initiated may further be stored in the call record 250. Later, at the conclusion of the service period, the time that service was concluded may be included in the call record 250. These additional values in call record 250 may allow for the reporting of information about the call to an accounting system (not shown). As discussed above, system 100 may be divided among multiple cooperating entities. For instance, a telecommunications service provider may be responsible for providing service by establishing and maintaining the connection between originating device 110 and terminating device 115. The prepaid service provider may be external to the telecommunications service provider and may merely monitor the service provided to user 111 in order to track and maintain account balance 220.

Next, in step 445, call processing module 135 may determine whether service continues to be provided to user 111. Call processing servers 130 may continuously monitor the connections between originating device 110 and terminating device 115. When a connection is ended, the call record 250 may be updated to reflect the ending time of the call. If service continues to be provided, the process returns to step 415. By returning to step 415, the process may repeatedly allocate and provide service according to steps 435 and 440.

Following a determination that service is no longer being provided in step 445, any unused portion of an allocation may be returned to account balance 220 in step 450. Because allocations of the account balance 220 are made for one or more service increments in step 435, there is a possibility that the account will be over billed due to the service ending before the end of the latest service increment. Moreover, the total call length, or service period, may be determined to be less that the sum of the lengths of time associated with the service increments. As discussed above, transaction details may include a start and end time of the call such that a call length, i.e. the service period, can be determined. Call processing server 130 may also track a sum of the lengths of time associated with any service increments. When the service period is less than the sum of the lengths of the service increments, the balance 220 may be adjusted to reflect the actual length of the call. Additionally, after service is no longer being provided to user 111, total burn rate 225 may be reduced by the call burn rate 270.

Following a determination that there is an insufficient balance in step 430, the user may be notified in step 455 and any ongoing service to user 111 may be ended. However, it is to be understood that service being provided to other users 111 may continue because other users 111 drawing from the same account balance 220 may still be using an allocation that has yet to be depleted. Similarly, because the call burn rate 270 of another user 111 may be lower, that user 111 may be able to continue to receive allocations of the account balance 220. Call processing server 130 may provide a message informing user 111 that the connection is about to be ended. Moreover, user 111 may be provided a brief amount of time to bring a conversation to an orderly end. Call processing server 130 may further instruct automated call distributor 125 to end the connection between originating device 110 and terminating device 115. Call processing server 130 may further reduce the total burn rate 225 by the call burn rate 270. Call processing server 130 may further complete call record 250.

Following steps 450 and 455, the process ends.

Accordingly, prepaid services system 100 enables simultaneous users 111 to draw down an account balance 220 of customer 112. Originating devices 110 to connect to terminating devices 115 with the connection fees and costs being billed to account balance 220. Incremental deductions from the account balance 220 throughout the service period allow simultaneous users 111 to share the same account balance 220. Call processing module 135 tracks a total burn rate 225 in order to determine when to effectuate an automatic recharge of the account balance 220.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A method implemented by at least one non-transitory device, the method comprising:
    associating a plurality of users with a prepaid services account;
    tracking a prepaid balance associated with the prepaid services account;
    deriving a total burn rate, of the prepaid services account, based on summing a burn rate, associated with a rate at which at least each user, of a subset of the plurality of users, draws down the prepaid balance;
    determining whether to recharge the prepaid services account based on the prepaid balance, the total burn rate of the prepaid services account, and a maximum recharge time for the prepaid services account;
    allocating a portion of the prepaid balance to the at least a subset of the plurality of users based on the determination;
    recalculating the burn rate based on a change in the at least a subset of the plurality of users; and
    providing a service to the at least a subset of the plurality of users based on the allocation.

2. The method of claim 1, further comprising:
    recharging the prepaid balance while providing of services.

3. The method of claim 1, where determining whether to recharge the prepaid services account further comprises:
    dividing the prepaid balance by the total burn rate to obtain a result; and
    comparing the result to the maximum recharge time.

4. The method of claim 1, where the allocating occurs asynchronously with respect to particular users of the at least a subset of the plurality of users.

5. The method of claim 1, where providing the service further comprises:
   calculating a service increment for each of the at least a subset of the plurality of users, where the service increment is based on a burn rate associated with each user of the at least a subset of the plurality of users and the prepaid balance.

6. A system, comprising:
   a memory to store a prepaid balance associated with an account; and
   at least one call processing server, associated with a group of callers, to:
      derive a total burn rate of the account based on a rate at which the group of callers draws down the prepaid balance;
      determine whether to recharge the account based on the prepaid balance, the total burn rate of the account, and a maximum recharge time for the account;
      allocate a portion of the prepaid balance to the group of callers based on the determination;
      provide a service to the group of callers based on the allocation; and
      calculate a service increment, for each caller of the group of callers, where the service increment is based on a burn rate associated with each caller of the group of callers and the prepaid balance.

7. The system of claim 6, where the at least one call processing server is further to:
   recharge the prepaid balance while providing service to at least one caller of the group of callers.

8. The system of claim 6, where when the at least one call processing server is to determine whether to recharge the account, the at least one call processing server further is to:
   divide the prepaid balance by the total burn rate to obtain a result; and
   compare the result to the maximum recharge time.

9. The system of claim 6, where when deriving the total burn rate, the at least one call processing server is further to:
   sum a burn rate associated with each caller of the group of callers.

10. The system of claim 9, where the at least one call processing server is further to:
    recalculate the burn rate based on a change in the group of callers.

11. The system of claim 6, where when allocating the portion of the prepaid balance, the at least one call processing server is further to:
    asynchronously allocate the portion of the prepaid balance to the group of callers.

12. A non-transitory device implemented method, comprising:
    maintaining an account having a prepaid balance, where the account is to track a usage of prepaid telecommunication services;
    associating a plurality of originating callers with the account;
    monitoring telecommunication service concurrently provided to at least a subset of the plurality of originating callers;
    dividing the telecommunication service into one or more periods of time;
    repeatedly allocating a portion of the prepaid balance to each originating caller of the at least a subset of originating callers for each period of time;
    calculating a total burn rate, of the account, by summing a burn rate associated with each originating caller of the at least a subset of the plurality of originating callers;
    dividing the prepaid balance by the total burn rate to obtain a result;
    comparing the result to a maximum recharge time for the account;
    determining whether to recharge the account based on the comparison, and
    recalculating the burn rate, for each originating caller of the at least a subset of the plurality of originating callers, based on a change in the at least a subset of the plurality of originating callers.

13. The method of claim 12, further comprising:
    recharging the prepaid balance contemporaneously with the allocating.

14. The method of claim 12, where the allocating occurs asynchronously with respect to particular originating callers of the at least a subset of the plurality of originating callers.

* * * * *